United States Patent
Navarrete Michelini et al.

(10) Patent No.: US 11,537,873 B2
(45) Date of Patent: Dec. 27, 2022

(54) PROCESSING METHOD AND SYSTEM FOR CONVOLUTIONAL NEURAL NETWORK, AND STORAGE MEDIUM

(71) Applicant: BOE TECHNOLOGY GROUP CO., LTD., Beijing (CN)

(72) Inventors: Pablo Navarrete Michelini, Beijing (CN); Hanwen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1189 days.

(21) Appl. No.: 16/073,195

(22) PCT Filed: Jan. 19, 2018

(86) PCT No.: PCT/CN2018/073434
§ 371 (c)(1),
(2) Date: Jul. 26, 2018

(87) PCT Pub. No.: WO2018/205676
PCT Pub. Date: Nov. 15, 2018

(65) Prior Publication Data
US 2021/0209459 A1 Jul. 8, 2021

(30) Foreign Application Priority Data
May 8, 2017 (CN) .......................... 201710318147.9

(51) Int. Cl.
*G06N 3/08* (2006.01)
*G06K 9/62* (2022.01)
*G06N 3/04* (2006.01)

(52) U.S. Cl.
CPC ............ *G06N 3/08* (2013.01); *G06K 9/6232* (2013.01); *G06K 9/6288* (2013.01); *G06N 3/0454* (2013.01); *G06N 3/0481* (2013.01)

(58) Field of Classification Search
USPC ........................... 706/15; 382/157, 159, 190
See application file for complete search history.

(56) References Cited

U.S. PATENT DOCUMENTS 6,172,718 B1 * 1/2001 Alvarez ................. H04N 5/208
348/625
2017/0031920 A1 * 2/2017 Manning ............... G06F 16/904

FOREIGN PATENT DOCUMENTS

| CN | 106127702 A | 11/2016 |
|---|---|---|
| CN | 106296692 A | 1/2017 |

(Continued)

OTHER PUBLICATIONS

Kancharla et al., Improving the Visual Quality of Generative Adversarial Network (GAN)-Generated Images Using the Multi-Scale Structural Similarity Index, 2018 IEEE pp. 3908-3912. (Year: 2018).*

(Continued)

*Primary Examiner* — Kathleen Y Dulaney
(74) *Attorney, Agent, or Firm* — Collard & Roe, P.C.

(57) ABSTRACT

Provided are a processing method and system for a convolutional neural network, and a computer-readable medium, the processing method includes training a generator and training a discriminator, wherein training a generator includes: extracting a low-resolution color image from a high-resolution color image; training parameters of a generator network, by using the low-resolution color image and a noise image as an input image, based on parameters of a discriminator network, and reducing a generator cost function; training a discriminator includes: inputting an output image of the trained generator network and the high-resolution color image to the discriminator network, respectively; training parameters of the discriminator network by reducing a discriminator cost function (S204) the generator cost function and the discriminator cost function represent a (Continued)

degree in which the output image of the generator network corresponds to the high-resolution color image.

20 Claims, 6 Drawing Sheets

(56) References Cited

FOREIGN PATENT DOCUMENTS

| CN | 107122826 A | 9/2017 |
|---|---|---|
| CN | 107169927 A | 9/2017 |
| CN | 108074215 A | 5/2018 |

OTHER PUBLICATIONS

International Search Report of PCT/CN2018/073434 in Chinese, dated Apr. 20, 2018 with English translation.
Notice of Transmittal of the International Search Report of PCT/CN2018/073434 in Chinese, dated Apr. 20, 2018.
Written Opinion of the International Searching Authority of PCT/CN2018/073434 in Chinese, dated Apr. 20, 2018 with English translation.
Wang, Kunfeng et al., "Generative Adversarial Networks GAN: The State of the Art and Beyond" Acta Automatica Sinica, Mar. 31, 2017 (31.30.2017) 3rd Issue, 43rd vol. ISSN: 0254-4156, paragraph 2 in left column on p. 322 to paragraph 2 in right column on p. 329.
Gulrajani, Ishaan et al., "Improved Training of Wassersteing GANs", arXiv:1704.00038v3 [cs.LG] Dec. 25, 2017, pp. 1-20.

* cited by examiner

PROCESSING METHOD AND SYSTEM FOR CONVOLUTIONAL NEURAL NETWORK, AND STORAGE MEDIUM

CROSS REFERENCE TO RELATED APPLICATIONS

This application is the National Stage of PCT/CN2018/073434 filed on Jan. 19, 2018, which claims priority under 35 U.S.C. § 119 of Chinese Application No. 201710318147.9 filed on May 8, 2017, the disclosure of which is incorporated by reference.

TECHNICAL FIELD

Embodiments of the present disclosure relate to the field of image processing technology, and more particularly to a processing method and a system for a convolutional neural network, and a storage medium.

BACKGROUND

Currently, deep learning techniques based on artificial neural network have made great progress in fields such as image classification, image capture and search, facial recognition, age and speech recognition, and so on. Convolutional Neural Network (CNN) is one type of artificial neural network that has developed in recent years and has attracted widespread attention, it can be applied in the field of classification and super-resolution.

SUMMARY

At least one embodiment of the present disclosure provides a processing method for a convolutional neural network, comprising training a generator and training a discriminator, wherein training a generator comprises: extracting a low-resolution color image from a high-resolution color image; training parameters of a generator network, by using the low-resolution color image and a noise image as an input image, based on parameters of a discriminator network, and reducing a generator cost function, wherein the generator network includes a lifting layer for lifting resolutions of a luminance component and a chrominance component of the input image; the generator cost function represents a degree of difference between an output image of the generator network and the high-resolution color image; training a discriminator comprises: inputting an output image of a trained generator network and the high-resolution color image to the discriminator network, respectively; training parameters of the discriminator network by reducing a discriminator cost function, wherein the discriminator network includes a pooling layer for reducing resolution; the discriminator cost function represents a degree in which the output image of the generator network corresponds to the high-resolution color image.

According to an embodiment of the present disclosure, the processing method further comprises alternately performing the steps of training the generator network and training the discriminator network.

According to an embodiment of the present disclosure, the generator cost function is composed of a first item, a second item, and an optional third item, the first item is based on an output obtained after the output image of the generator network passes through the discriminator network; the second item is based on a difference between the low-resolution color image and a degraded image obtained after subjecting the output image of the generator network to the same degradation process as that from the high-resolution color image to the low-resolution color image; the third term is based on a ratio of a magnitude of a weight of a filter in a convolutional layer to a magnitude of a bias of an activation layer as included in parameters of the generator network.

According to an embodiment of the present disclosure, the discriminator cost function is composed of a first item, a second item, and an optional third item, the first item is based on an output obtained after the output image of the generator network passes through the discriminator network; the second item is based on an output obtained after the high-resolution color image passes through the discriminator network; the third term is based on an output obtained after a combination of the output image of the generator network and the high-resolution color image passes through the discriminator network.

According to an embodiment of the present disclosure, a degree of resolution lifting of the luminance component is the same as a degree of resolution lifting of the chrominance component, wherein the generator network includes any one of the following: a first generator network having the same number of first lifting layers for both the luminance component and the chrominance component; a second generator network having a certain number of first lifting layers for the luminance component, and having first lifting layers for the chrominance component that are fewer than those for the luminance component and second lifting layers different from the first lifting layers for the chrominance component; a third generator network having a certain number of first lifting layers for the luminance component, and having second lifting layers different from the first lifting layers for the chrominance component.

According to an embodiment of the present disclosure, the lifting layer is interposed between a convolutional layer and an activation layer of the generator network, and a degradation layer is interposed between a convolutional layer and an activation layer of the discriminator network; parameters of the generator network include a weight of a filter of the convolutional layer, a bias of the activation layer, and a lifting parameter of the lifting layer in the generator network; parameters of the discriminator network include a bias of the activation layer, a weight of a filter of the convolutional layer, and a degrading parameter of the degrading layer in the discriminator network; at initialization, parameters of the generator network and parameters of the discriminator network are predetermined or random.

According to an embodiment of the present disclosure, the activation layer is a switching unit for being turned on when an activation condition is satisfied.

According to an embodiment of the present disclosure, the discriminator network further includes an averager configured to average all pixels of an image whose resolution is reduced by the pooling layer, so as to obtain an index indicating whether an input to the discriminator network is the output image of the trained generator network or the high-resolution color image.

According to an embodiment of the present disclosure, extracting the low-resolution color image comprises: segmenting from a series of high-resolution color sample images to obtain a plurality of high-resolution color images having a size smaller than that of the high-resolution color sample image; performing the degradation process on the plurality of high-resolution color images to obtain a plurality of low-resolution color images with a reduced resolution.

According to an embodiment of the present disclosure, the noise image is a white noise image.

According to an embodiment of the present disclosure, the lifting layer copies pixels inputted to the lifting layer to a plurality of different locations of an output of the lifting layer which has a resolution higher than the resolution of the inputted pixels.

According to an embodiment of the present disclosure, the pooling layer includes at least one of a degradation layer corresponding to the lifting layer, a Max-pooling layer, and an Average-pooling layer.

According to an embodiment of the present disclosure, a resolution of the output image of the generator network is the same as a resolution of the high-resolution color image.

According to an embodiment of the present disclosure, the low-resolution color image is an average of a plurality of consecutive video frames.

At least one embodiment of the present disclosure provides a processing system for a convolutional neural network, comprising: one or more processors; one or more memories in which computer-readable codes are stored, the computer-readable codes when executed by the one or more processors, executing the processing method according to any one of at least embodiment of the present disclosure.

At least one embodiment of the present disclosure provides a non-transitory computer storage medium, in which computer-readable codes are stored, the computer-readable codes when executed by the one or more processors, executing the processing method according to any one of at least embodiment of the present disclosure.

The present disclosure introduces a new convolutional neural network system architecture, and provides a processing method and system and a storage medium for the convolutional neural network. Quality of resolution-amplified images are improved by effectively utilizing color information, improving internal convolutional network architecture and training strategies, and traditional training strategies are replaced with adversarial network methods, on the basis of which, necessary additional noise inputs are included, which allows artificial generation of details.

BRIEF DESCRIPTION OF THE DRAWINGS

In order to more clearly illustrate the technical solutions of the embodiments of the present disclosure, the drawings of the embodiments will be described briefly below. Obviously, the drawings in the following description merely relate to some embodiments of the present disclosure, but do not intended to limit the present disclosure.

DETAILED DESCRIPTION OF THE EMBODIMENTS

Figure 1:
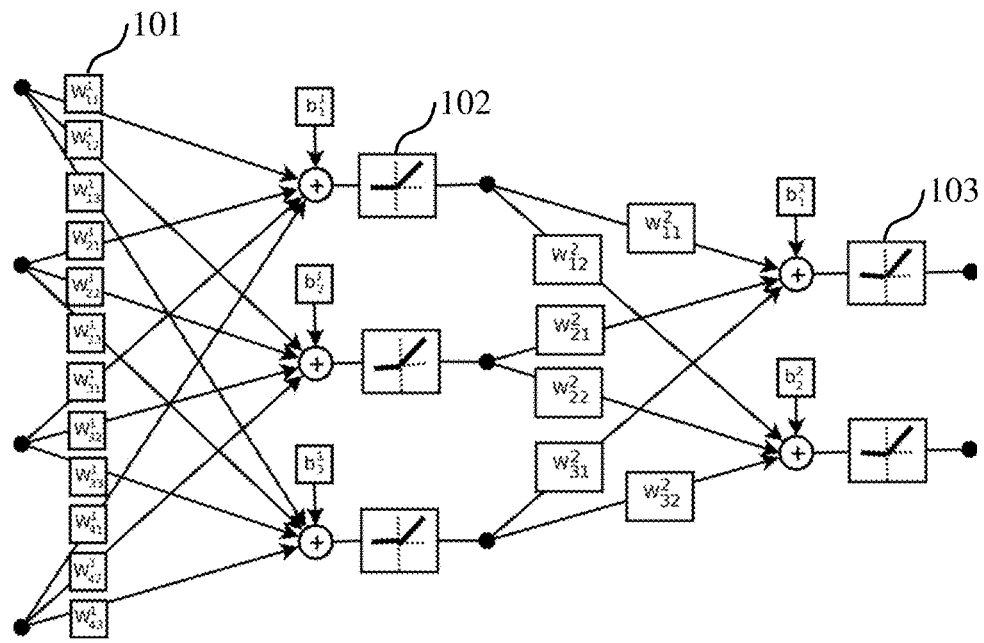
FIG. 1 shows a simplified schematic diagram of a convolutional neural network.

Hereinafter, to make the objectives, the technical solutions and the advantages of the embodiments of the present disclosure more clear, the technical solutions in the embodiments of the present disclosure will be described clearly and comprehensively in combination with the drawings. Obviously, these described embodiments are parts of the embodiments of the present disclosure, rather than all of the embodiments thereof. All the other embodiments obtained by those of ordinary skill in the art based on the embodiments of the present disclosure without paying creative efforts fall into the protection scope of the present disclosure.

Unless otherwise defined, technical terms or scientific terms used herein shall have common meaning known by those skilled in the art of the present disclosure. Words and expressions such as "first", "second" and the like used in the present disclosure do not denote any sequence, quantity or importance, but are used to distinguish different components. Words such as "include", "comprise" and the like refer to that an element or an object before this word contains the elements or objects and equivalents thereof listed thereinafter, without excluding other elements or objects. Words such as "connected", "connecting" and the like are not restricted to physical or mechanical connections, but may include electrical connections or signal connections, regardless of direct or indirect connections.

The information technology market has invested heavily in deep learning in the past five years. The main use of this technique today is to solve artificial intelligence (AI) problems such as recommendation engine, image classification, image captions and search, face recognition, age recognition, speech recognition, and so on. In general, deep learning technique has successfully solved the understanding of similar data, such as describing contents of an image or object conditions of an image that is hard to identify, or recognizing speech in noisy environments. Another advantage of deep learning is its universal structure, which allows very different problems to be solved with relatively similar systems. Compared to its predecessor methods, neural network and deep learning structure are much larger in number of filters and layers.

Convolutional neural network is a special structure of neural network, its main uses are roughly divided into two categories: first, classification; second, super-resolution. For a classification problem, the input is high-resolution data (e.g., image or video) and the output is low-resolution data (e.g., label, location of object, etc.). As to this special case, great progress has been made in deep learning. For example, one of the most common layers in a deep learning structure is the so-called max-pooling layer, which reduces the resolution of a feature image by taking the maximum value in adjacent pixels. On the other hand, a super-resolution problem requires high-resolution data as input (images) and increases their size to a larger amount of data (higher resolution), which increases the resolution. This has completely changed the design of the deep learning structure.

A main component of the deep learning system is the convolutional network. The convolutional network is a neural network structure that uses images as input/output and replaces scalar weights with filters (i.e., convolutions). FIG. 1 shows a simplified schematic diagram of a convolutional neural network, which has a simple structure of three layers. This convolutional neural network is configured, for example, for image processing, uses images as input and output, and replace scalar weights, for example, with filters (i.e. convolutions). As shown in FIG. 1, this structure acquires four input images at one convolutional layer 101 of four input terminals on the left side, has three units (output images) at an activation layer 102 in the center, and has two units at another convolutional layer 103 and produces two output images. Each box having a weight $W_{ij}^k$ corresponds to a filter (e.g., a 3×3 or 5×5 kernel), where k is a tag that indicates a serial number of an input layer, and i and j are tags that indicate the input and output units respectively. The bias $b_i^k$ is a scalar added to outputs of convolutions. A result in which several convolutions and biases are added is then passed through an activity box of an activation layer, the activity box usually corresponds to a rectifying linear unit (ReLU) or a sigmoid function or a hyperbolic tangent or the like. Weights and biases of filters are fixed during an operating period of the system, are obtained through a training process using a set of input/output example images, and are adjusted to fit some optimization criteria depending on an application. A typical configuration involves hundreds of filters or one tenth in each layer. A network with three layers is considered to be shallow, while a network with a number of layers greater than five or ten is generally considered to be deep.

The current deep learning study on the super-resolution problem avoids the problem of increasing the input dimension by adding a traditional upscaler to the convolutional neural network as a first stage (e.g., bicubic), then the deep learning structure that does not reduce or increase features and sizes of output images can be applied.

The present disclosure introduces a new convolutional neural network system architecture, in which quality of resolution-amplified images are improved by effectively utilizing color information, improving internal convolutional network architecture and training strategies, and traditional training strategies are replaced with adversarial network methods, on the basis of which, necessary additional noise inputs are included, which allows artificial generation of details.

The adversarial network according to an embodiment of the present disclosure uses two convolutional neural network systems, namely: a so-called "generator", which is a generator network; and a so-called "discriminator" network, configured to evaluate quality of an image with a magnified resolution. In the present disclosure, the "discriminator" can receive a color image as an input, and output, for example, a numeric like −1 or 1. If the output is 1, the "discriminator" will consider that the color image corresponds to the original high-resolution content. If the output is −1, the "discriminator" will consider that the color image is an output processed by the generator network. A generator is trained to maximize the output of the "discriminator", so as to make the output as realistic as possible. And the "discriminator" is trained to accurately distinguish between the original high-resolution content and the processed content. The two networks alternately execute training steps to compete with each other and obtain optimal parameters.

Figure 2A:
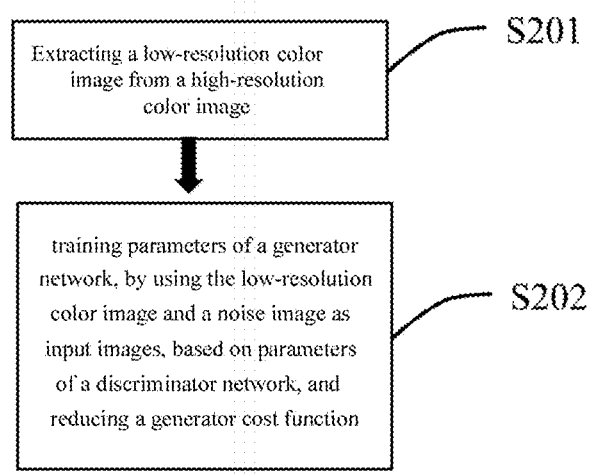
FIG. 2A shows a flow chart of training a generator in a processing method for a convolutional neural network according to an embodiment of the present disclosure.

FIG. 2A shows a flow chart of training a generator in a processing method for a convolutional neural network according to an embodiment of the present disclosure. As shown in FIG. 2A, in step S201, a high-resolution color image is utilized to extract a low-resolution color image therefrom, for training a generator network.

Next, at step S202, parameters of a generator network are trained, by using the low-resolution color image and a noise image as an input image, based on parameters of a discriminator network, and reducing a generator cost function, so that a difference between the output image of the generator network and the high-resolution color image is reduced. The generator network includes a lifting layer for lifting resolutions of a luminance component and a chrominance component of the input image; the generator cost function represents a degree of difference between an output image of the generator network and the high-resolution color image.

Figure 2B:
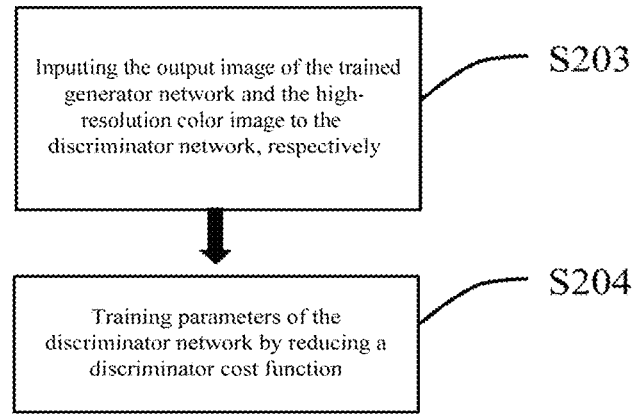
FIG. 2B shows a flow chart of training a discriminator in a processing method for a convolutional neural network according to an embodiment of the present disclosure.

FIG. 2B shows a flow chart of training a discriminator in a processing method for a convolutional neural network according to an embodiment of the present disclosure. As shown in FIG. 2B, in step S203, an output image of a trained generator network and the high-resolution color image are inputted to the discriminator network, respectively.

Next, in step S204, parameters of the discriminator network are trained by reducing the discriminator cost function, so that the discriminator network outputs an index indicating whether an input to the discriminator network is the output image of the generator network or the high-resolution color image. The discriminator network includes a pooling layer for reducing resolution, for example, the pooling layer may be a degradation layer corresponding to the lifting layer in the generator network. The discriminator cost function represents a degree in which the output image of the generator network corresponds to the high-resolution color image.

According to an embodiment of the present disclosure, the generator network and the discriminator network are both in the form of a convolutional neural network and have respective parameters of the convolutional neural network. For example, parameters of the generator network may include a weight of a filter of the convolutional layer, a bias of the activation layer, and a lifting parameter of the lifting layer in the generator network; wherein parameters of the discriminator network may include a bias of the activation layer, a weight of a filter of the convolutional layer, and a degrading parameter of the degradation layer in the discriminator network. And at initialization, parameters of the generator network and parameters of the discriminator network may be predetermined or random.

According to an embodiment of the present disclosure, also inputting the noise image into the generator network can increase artificial details in the output image of the generator network, and can produce varying artificial details in each training.

According to an embodiment of the present disclosure, the steps of training the generator network and training the discriminator network as described above are alternated using different low-resolution color images and noise images, final parameters of the generator network and final parameters of the discriminator network are obtained by continuously reducing the generator cost function and the discriminator cost function. The trained generator network strives to generate an output image that causes the output of the discriminator network to be close to 1, and the trained discriminator network strives to distinguish between the image generated by the generator network and the original high-resolution image thereof, further training is achieved through mutual confronting between the two.

In this way, the generator network and the discriminator network are alternately trained, wherein training is performed alternately in the sequence of, for example, training the generator, training the discriminator, training the generator, training the discriminator, etc., wherein one generator training step and one discriminator training step may be referred to as one iteration. Alternatively, the steps of training the generator and training the discriminator may also be exchanged in sequence, that is, alternately training in the sequence of training the discriminator, training the generator, training the discriminator, training the generator, etc., wherein one discriminator training step and one generator training step may be referred to as one iteration. The alternate training may also be performed in other manners, not limited to the above training sequence.

Since the process of training the generator network as described above is based on the parameters of the discriminator network, training of the generator network is based on a training result of the discriminator network (i.e. the training result of parameters of the discriminator network), and because the process of training the discriminator network requires to use the output image of the generator network, training of the discriminator network is in turn based on a training result of the generator network (i.e. the training result of parameters of the generator network), this manner is called "adversarial", i.e. the generator network and the discriminator network are "adversarial" to each other. This method allows two mutually "adversarial" networks to compete and continually improve in each iteration based on better and better results of the other network, thereby being trained to obtain better and better parameters or even optimal parameters.

In an embodiment of the present disclosure, different low-resolution color images and different noise images may be adopted. In other embodiments according to the present disclosure, the same noise image may be adopted while different low-resolution color images are adopted.

In an embodiment, the generator cost function may be composed of a first item, a second item, and an optional third item, the first item may be based on an output obtained after the output image of the generator network passes through the discriminator network; the second item may be based on a difference between the low-resolution color image and a degraded image obtained after subjecting the output image of the generator network to the same degradation process as that from the high-resolution color image to the low-resolution color image; the third term may be based on a ratio of a magnitude of a weight of a filter in a convolutional layer to a magnitude of a bias of an activation layer as included in parameters of the generator network.

The first item attempts to maximize an output of the discriminator network, or equivalently attempts to make the output image that has been lifted by the generator network look like the original high-resolution color image for the discriminator network. If only the first item is used, the generator network will find the simplest, realistic images that are unrelated to the input image, they are those unchanged low-resolution images. Therefore, it is hoped that not only the first item will be considered to solve the cost function problem of the generator network. The second item emphasizes that a degraded image obtained after subjecting the output image of the generator network to the same degradation process as that of extracting the low-resolution color image from the high-resolution color image should match these low-resolution color images as much as possible, as such, it encourages the generator network to find meaningful solutions. The third term is used to improve the results of the generator network by using a bias larger than the weight of the filter. In general, it is convenient for the convolutional neural networks to have a large bias (B), because they separate features into classes that are processed independently, and values of these features depend on the weight (W) of the filter, so in the third term, it is desired to apply a bias larger than the weight.

As such, the generator cost function may represent a degree of difference between an output image of the generator network and the high-resolution color image, and because of having the first term, the above-mentioned "adversarial" effect can be achieved based on the parameters of the discriminator network.

In an embodiment, the discriminator cost function is composed of a first item, a second item, and an optional third item, the first item is based on an output obtained after the output image of the generator network passes through the discriminator network; the second item is based on an output obtained after the high-resolution color image passes through the discriminator network; the third term is based on an output obtained after a combination of the output image of the generator network and the high-resolution color image passes through the discriminator network.

In this way, the discriminator cost function may represent a degree in which the output image of the generator network corresponds to the high-resolution color image.

In an embodiment, a degree of resolution lifting of the luminance component is the same as a degree of resolution lifting of the chrominance component, wherein the generator network includes any one of the following: a first generator network having the same number of first lifting layers for both the luminance component and the chrominance component; a second generator network having a certain number of first lifting layers for the luminance component, and having first lifting layers for the chrominance component that are fewer than those for the luminance component and second lifting layers different from the first lifting layers for the chrominance component; a third generator network having a certain number of first lifting layers for the luminance component, and having second lifting layers different from the first lifting layers for the chrominance component.

For example, the first lifting layer may copy pixels inputted to the lifting layer to a plurality of different locations of an output of the lifting layer, which output has a resolution higher than the resolution of the inputted pixels, whereas the second lifting layer may be a traditional bicubic method.

In this way, structure of the three types of generator network can reflect different performance of resolution lifting to the chrominance component and require different computational costs. Therefore, an appropriate structure of the generator network can be selected based on the different performance required and the different computational costs.

In an embodiment, the lifting layer may be interposed between a convolutional layer and an activation layer of the generator network (i.e., in the sequence of a convolutional layer, a lifting layer, and an activation layer), and the degradation layer may be interposed between a convolutional layer and an activation layer of the discriminator network (i.e., in the sequence of a convolutional layer, a degradation layer, and an activation layer).

In this way, the effect of such sequence is better, because the output of the convolutional layer is not selected by the activation layer, it is selected by the activation layer until being amplified by the lifting layer.

In an embodiment, the activation layer may adopt a conventional rectifying linear unit (ReLU) (as described in FIG. 1), or may adopt a switching unit for being turned on when an activation condition is satisfied. Such "switching unit" does not add a constant in its output. When such switching unit is used in the convolutional neural network, the convolutional neural network will not generate a constant term in the output. This is better for interpolation tasks such as image resolution magnification.

In an embodiment, the discriminator network may further include an averager configured to average all pixels of an image whose resolution is reduced by the pooling layer, so as to obtain an index indicating whether an input to the discriminator network is the output image of the trained generator network or the high-resolution color image. Such an index may be a numeric that more simply indicates whether an input to the discriminator network is the output image of the trained generator network or the high-resolution color image.

In an embodiment, the low-resolution color image may be extracted by the following steps: segmenting from a series of high-resolution color sample images to obtain a plurality of high-resolution color images having a size smaller than the high-resolution color sample image; performing degradation process on the plurality of high-resolution color images to obtain a plurality of low-resolution color images with a reduced resolution. The noise image may be a white noise image, such as uniform noise with a fixed distribution, Gaussian noise, etc., wherein each pixel value is a random number that is uncorrelated with its neighboring values. Of course, the noise image is not limited to the examples exemplified above, any image capable of providing a certain style can be used herein.

In an embodiment, the pooling layer may include at least one of a degradation layer corresponding to the lifting layer, a Max-pooling layer, and an Average-pooling layer. Of course, the pooling layer is not limited to the examples exemplified above, but those capable of pooling to reduce the resolution may be employed.

In an embodiment, a resolution of the output image of the generator network is the same as a resolution of the high-resolution color image. In this way, the difference between the output image of the generator network and the high-resolution color image can be compared correspondingly.

In an embodiment, the low-resolution color image is an average of a plurality of consecutive video frames, in the case of lifting the resolution of a video sequence including several consecutive video frames.

To sum up, in the respective embodiments according to the present disclosure, two "adversarial" networks, the generator network and the discriminator network, compete and continually improve in each iteration based on better and better results of the other network, thereby being trained to obtain better and better parameters or even optimal parameters.

Figure 3A:
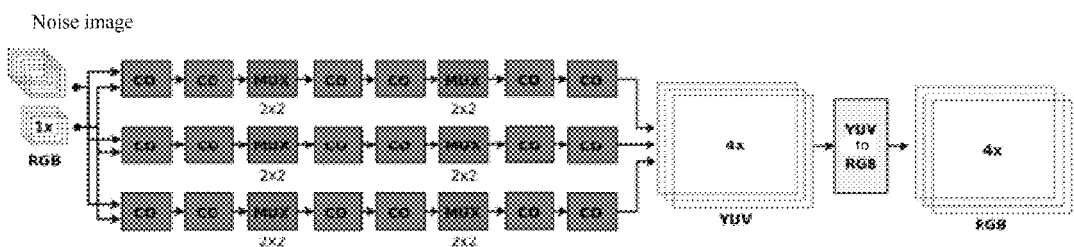
FIGS. 3A-3C show a schematic diagram of three optional types of a generator network according to an embodiment of the present disclosure, respectively.
Figure 3B:
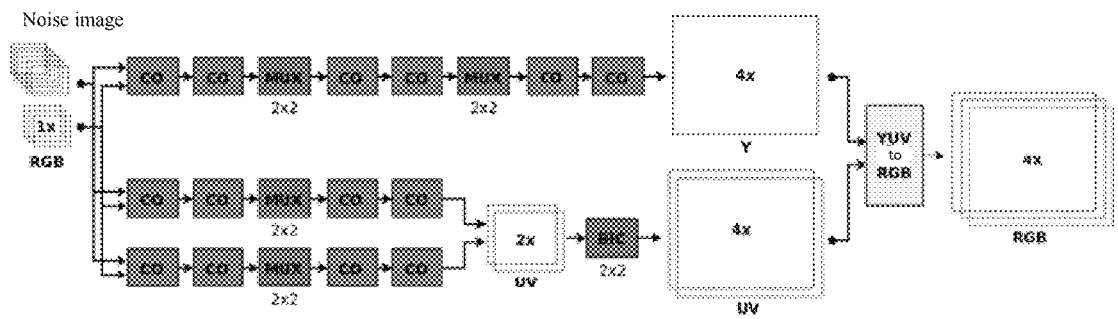
Figure 3C:
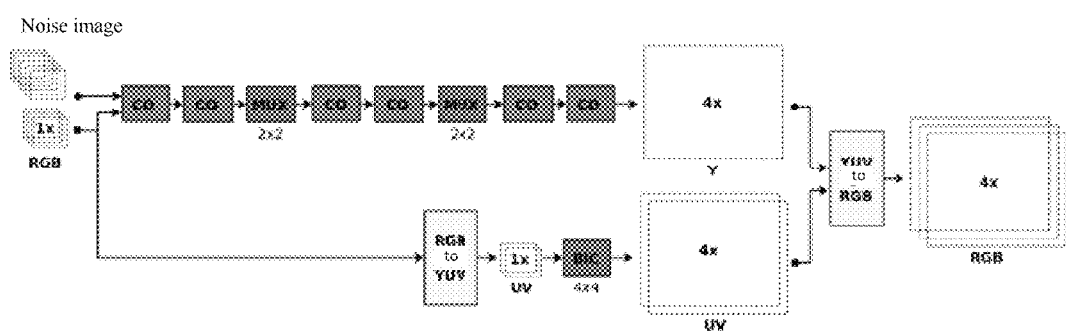

FIGS. 3A-3C show a schematic diagram of three optional types of a generator network according to an embodiment of the present disclosure, respectively.

Most traditional super-resolution networks only make special lifting to the luminance component of the color image (the Y component in YUV). The chrominance component (U and V channels) is typically resolution-amplified using bicubic or other standard lifting techniques. For a relatively large magnification factors (e.g., 6×, 8×, . . . ), the effects of different processing on the luminance component and the chrominance component can result in visible artifacts. The present disclosure herein uses three optional configurations to process color images having different qualities and performances. It is to be noted that a noise image is also added to the input image. This helps create artificial details in the output image.

Specific details of various embodiments according to the present disclosure are also described in greater detail below in conjunction with FIGS. 3A-3C.

In FIG. 3A, the generator network uses three channels Y (luminance component), U and V (chrominance components) of a convolutional neural network with two lifting layers (exemplified in the figure as MUX layers). A CO block corresponds to a conventional convolution layer or an activation layer. Specifically, the generator network converts an RGB (red, green, blue) input image into three channels of Y, U, and V, and then it passes through a convolution layer, a lifting layer, an activation layer, a convolutional layer, a lifting layer, and an activation layer, etc., an image with a lifted resolution is obtained, and then converted back to an RGB image through YUV-to-RGB for output.

In FIG. 3B, the generator network uses a convolutional neural network with two MUX layers to lift only the Y channel. U and V use only one MUX layer, and another MUX layer that lifts the Y channel is replaced by a standard resizing technique such as Bicubic. The generator network also passes through RGB-to-YUV at the input and YUV-to-RGB at the output, which will not be described herein.

In FIG. 3C, this generator network uses a convolutional neural network with only two MUX layers for the Y channel only. Resolution of the color channels U and V is enlarged using standard techniques such as Bicubic. The generator network also passes through RGB-to-YUV at the input and YUV-to-RGB at the output, which will not be described herein.

Of course, in these three optional generator networks, a degree of resolution amplification of the luminance component is the same as a degree of resolution amplification of the chrominance component, that is, the output of chrominance component and the output of the luminance component are guaranteed to have the same resolution, so that they can be combined into a color output image with the same resolution. For example, in FIG. 3B, there are two MUX layers in the processing of the luminance component, on each of which 2*2 resolution amplification is performed respectively, so a total of 2*2*2*2 amplification is performed; and in the processing of the chrominance components, there is only one MUX layer, 2*2 amplification is performed firstly, and then the traditional Bicubic layer is passed through so as to perform 2*2 amplification for another time. In FIG. 3C, there are two MUX layers in the processing of the luminance component, on each of which 2*2 resolution amplification is performed respectively, and a total of 2*2*2*2 amplification is performed, whereas for the chrominance component, it goes through the conventional Bicubic layer, so that 4*4 magnification is performed for one time.

Figure 4:
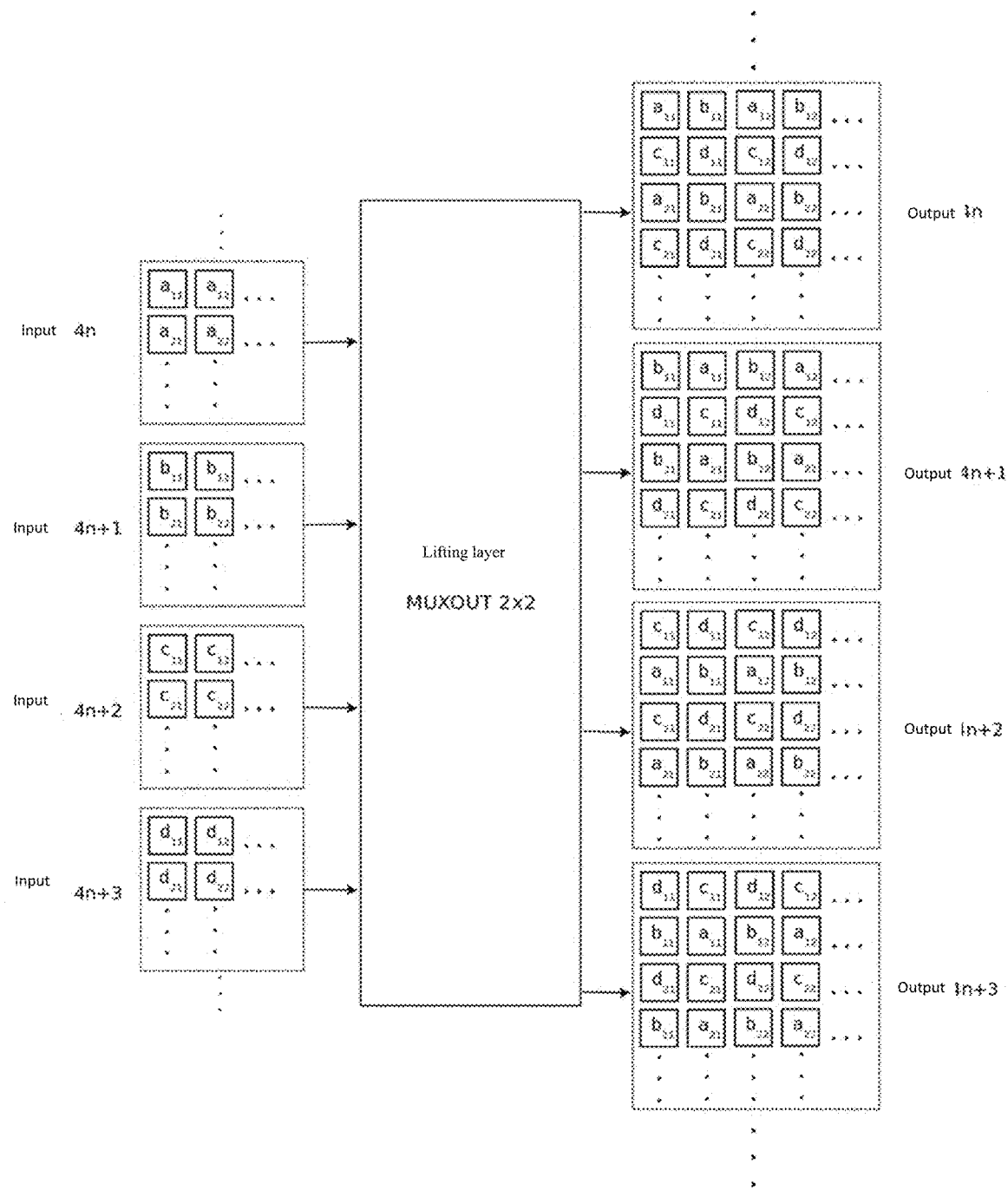
FIG. 4 shows an example of a lifting layer in a generator network according to an embodiment of the present disclosure.

FIG. 4 shows an example of a lifting layer (exemplified as a MUX layer in this figure) in a generator network according to an embodiment of the present disclosure.

Specifically, as shown in FIG. 4, a factor $M=M_x \times M_y$ of the MUX layer increases the resolution from the input feature to the output features, in which:

the input feature is:

$$x_{i,j}^{c,L}, i=0\ldots H-1, j=0\ldots W-1$$

the output feature is:

$$y_{p,q}^{c,L}, p=0,\ldots,M_y H-1, q=0\ldots M_x W-1$$

A universal definition of this MUX layer is as following:

First, $U^1, \ldots U^M$ is an up-sampling operator for copying pixels to features larger than zero at different locations:

$$y_{p,q}^{c,L} = U^n(x_{i,j}^{c,L}) = \begin{cases} x_{i,j}^{c,L} & \text{if } \begin{array}{l} i = M_y p + a \text{ and } j = M_x q + b \\ p = 0 \ldots M_y - 1, q = 0 \ldots M_x - 1 \\ a = (n-1)\% M_y, b = \lfloor (n-1)/M_y \rfloor \end{array} \\ 0 & \text{Others} \end{cases}$$

Herein, % is a "modulo" operator, and [x] is the largest integer <x, so that n=$M_y$a+b+1. The number of features that need to be inputted to the MUX layer is a multiple of M, that is, C=G·M with an integer G. The number of the output features is unchanged, which is equal to c, wherein c denotes the number of input terminals, (p, q) denotes an inputted pixel. The features are processed with a set having M features, so the input and the output in the set are divided into: x=[$x^1 \ldots x^G$] and =[$y^1 \ldots y^G$]. Then, the output of the MUX layer may be written as:

$$y^1 = U^1 x^1 + \cdots + U^M x^M$$
$$y^2 = U^2 x^1 + \cdots + U^1 x^M$$
$$\ldots$$
$$y^G = U^M x^1 + \cdots + U^M x^M$$

In the example of FIG. 4, $M_y$=$M_x$=2 (M=4).

In this way, the resolution is increased by adding the lifting layer (MUX layer).

Of course, FIG. 4 only shows an example of the lifting layer, but the present disclosure is not limited thereto, other implementations of the lifting layer may also be adopted.

Figure 5:
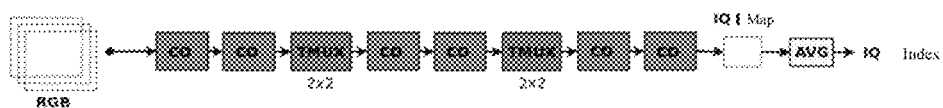
FIG. 5 shows a schematic diagram of a discriminator network according to an embodiment of the present disclosure.

FIG. 5 shows a schematic diagram of a discriminator network according to an embodiment of the present disclosure.

The discriminator network shown in FIG. 5 includes a degradation layer (exemplified as the TMUX layer) corresponding to the MUX layer in the generator network, thereby degrading the high-resolution image inputted to the discriminator network to a low-resolution imagen input image with the same resolution as the input image of the generator network.

The discriminator network uses a convolutional neural network to output an image "IQ Map" similar to other image quality metrics (e.g., structural similarity index (SSIM)). An average value obtained by averaging all the pixels in the "IQ Map" is taken as a single numeric "IQ index" which is an output.

Of course, the degradation layer is not limited to the degradation layer (exemplified as the TMUX layer) corresponding to the MUX layer in the generator network, and may be other pooling layers, such as a Max-pooling layer, an Average-pooling layer, and the like.

Figure 6A:
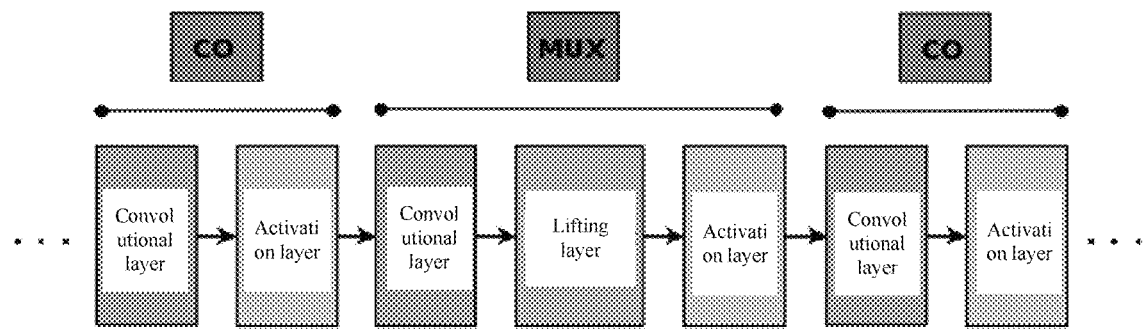
FIG. 6A shows a schematic diagram of location of a lifting layer in a generator network according to an embodiment of the present disclosure.

FIG. 6A shows a schematic diagram of location of a lifting layer in a generator network according to an embodiment of the present disclosure.

As shown in FIG. 6A, the lifting layer is inserted between the convolutional layer and the activation layer. The effect of such a sequence is better, because the output of the convolutional layer is not selected by the activation layer, but is selected by the activation layer until being amplified by the lifting layer.

Figure 6B:
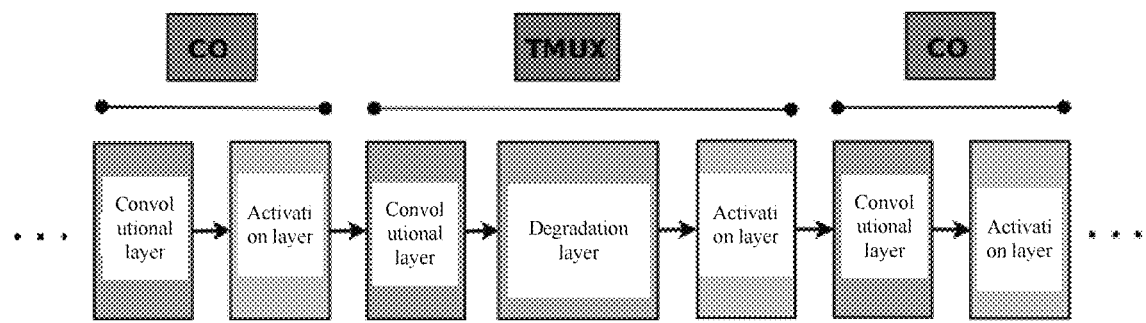
FIG. 6B shows a schematic diagram of location of a degradation layer in a discriminator network according to an embodiment of the present disclosure.

FIG. 6B shows a schematic diagram of location of a degradation layer in a discriminator network according to an embodiment of the present disclosure.

As shown in FIG. 6B, the degradation layer is inserted between the convolutional layer and the activation layer. The effect of such a sequence is better, because the output of the convolutional layer is not selected by the activation layer, but is selected by the activation layer until being degraded by the degradation layer.

Figure 7A:
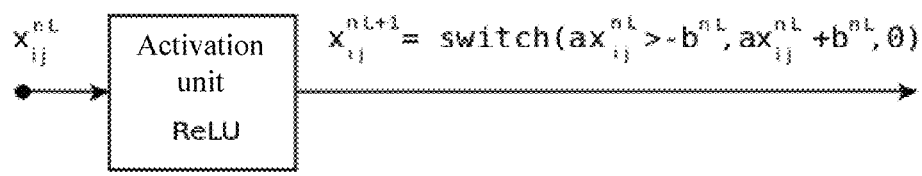
FIGS. 7A and 7B show two implementations of an activation layer in a generator network, respectively.
Figure 7B:
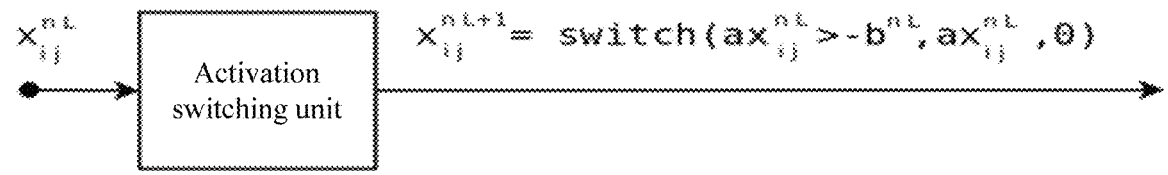

FIGS. 7A and 7B show two implementations of an activation layer in a generator network, respectively.

First, FIG. 7A shows a standard ReLU as an activation layer, wherein i, j denote number of rows and number of columns of pixel dots of the input image, L denotes number of layers, and n denotes number of input terminals. Herein, a and b denote coefficients.

FIG. 7B shows a switching unit which is an activation unit in the activation layer. In the switching unit, if "condition" is true, then switch (condition A1, B1) is equal to A1, otherwise it is B1. Next, a new type of activation layer called a "switching unit" does not add a constant to the output. When a switching unit is used in a convolutional neural network, the convolutional neural network will not generate a constant term in the output. This is better for interpolation tasks such as image resolution magnification.

The cost function used in the training process of the generator network and the discriminator network will be introduced in detail below.

It should be noted that the generator network and the discriminator network which belong to a convolutional neural network both include a large number of parameters, for example, including the weight (W) of the filter of the convolution layer, the parameter (A) of the lifting layer or the degradation layer, and the bias (B) of the activation layer. A set of parameters (or referred to as a parameter set) corresponds to the generator network, and another set of parameters (or referred to as a parameter set) corresponds to the discriminator network. The training process is to obtain an optimal parameter set of the generator network and an optimal parameter set of the discriminator network.

In the "adversarial" network as described in various embodiments of the present disclosure, the "generator network" and the "discriminator network" independently complete a parameter search process (or a training process). In the present disclosure, an image patch is used as training data. The image patch is a subset of a larger image obtained from an image data set, that is, a smaller image is segmented from the larger image as an image patch. For example, among 500 image data sets of 480×320 pixels, a set of 30,000 image patches of 80×80 pixels can be randomly extracted from the image data set, and these image patches can be obtained from random locations within each image of the image data set. A set of these image patches can be used as a REFERENCE for the original high-resolution color image. The set of image patches may be reduced in resolution using a standard degradation algorithm (e.g., region, bicubic, etc.), so as to obtain a set of INPUT image patch examples as an example of the low-resolution color image. The generator network will only use the low-resolution INPUT image patch as the training data to be inputted. The discriminator network will use the output image obtained after the low-resolution INPUT image patch passes through the generator network and the high-resolution REFERENCE image patch as the training data to be inputted.

In addition, the respective cost functions are also specified for the "generator Network" and "discriminator Network". The cost function provides a score that is reduced during the training process for the convolutional neural network performance. The respective examples (not limitations) of the discriminator cost function and the generator cost function according to various embodiments of the present disclosure are as follows:

1) Discriminator Cost Function:

$$L_D = \frac{1}{N}\sum_{b=1}^{N} D(\tilde{x}) - \frac{1}{N}\sum_{b=1}^{N} D(x) + \lambda \frac{1}{N}\sum_{b=1}^{N}\left(\sum_{f,i,j}^{3,H,W}(\nabla_{\hat{x}}D(\hat{x}))^2 - 1\right)^2$$

The discriminator cost function is composed of a first item, a second item, and an optional third item, the first item is based on an output obtained after the output image of the generator network passes through the discriminator network; the second item is based on an output obtained after the high-resolution color image passes through the discriminator network; the third term is based on an output obtained after a combination of the output image of the generator network and the high-resolution color image passes through the discriminator network.

Herein, the first item is $$\frac{1}{N}\sum_{b=1}^{N} D(\tilde{x}).$$

Herein, $\tilde{x}$=Output(INPUT) is the output image generated after the inputted low-resolute image patch INPUT passes through the generator network. While D( ) represents a function of the discriminator network. Thus, D($\tilde{x}$) represents the output obtained after the output image of the generator network passes through the discriminator network. In the example of the present disclosure, this output is a value selected between −1 and 1. N represents the number of INPUT image patchs inputted to the generator network.

Thus, $$\frac{1}{N}\sum_{b=1}^{N} D(\tilde{x})$$

represents an average of outputs obtained after N low-resolution INPUT image patches pass through the discriminator network.

The second item is $$-\frac{1}{N}\sum_{b=1}^{N} D(x).$$

Herein, x is the original high-resolution REFERENCE image patch, N represents the number of REFERENCE image patches, which is the same as the number of low-resolution INPUT image patches. Thus, $$\frac{1}{N}\sum_{b=1}^{N} D(x)$$

represents an average of the outputs obtained after the high-resolution REFERENCE image patch passes through the discriminator network.

The second item is based on outputs obtained after the high-resolution color image (REFERENCE image patches) passes through the discriminator network.

A combination of the first item and the second item represents a difference between the average of outputs obtained after N low-resolution INPPUT image patches pass through the discriminator network and the average of outputs obtained after the high-resolution REFERENCE image patches pass through the discriminator network.

The $\hat{x}=\varepsilon x+(1-\varepsilon)\tilde{x}$ the third item is a combination of the output image generated after the low-resolution image patch INPUT passes through the generator network and the high-resolution color image (REFERENCE image patch) (where $\varepsilon\sim U[0,1]$ is a random variable numeric during training). $\nabla$ represents the gradient operation. The resolution of these images is $\hat{x}$ (high)*W (width). f represents one channel of R, G, and B, and 3 represents 3 channels of R, G, and B. And $\lambda$ is the weighting factor. This third item is an improvement with reference to the detailed definition of Stochastic gradient descent (SGD).

2) Generator Cost Function:

$$L_G = -\frac{1}{N}\sum_{b=1}^{N} D(\text{Output}(\text{INPUT})) +$$

$$\lambda_1 DownReg(\text{INPUT}) + \lambda_2 WBratioReg(W_G, b_G)$$

The generator cost function is composed of a first item, a second item, and an optional third item, the first item is based on an output obtained after the output image of the generator network passes through the discriminator network; the second item is based on a difference between the low-resolution color image and a degraded image obtained after subjecting the output image of the generator network to the same degradation process as that from the high-resolution color image to the low-resolution color image; the third term is based on a ratio of a magnitude of a weight of a filter in a convolutional layer to a magnitude of a bias of an activation layer as included in parameters of the generator network.

Herein, the first item $$-\frac{1}{N}\sum_{b=1}^{N} D(\text{Output}(\text{INPUT}))$$

represents an average of outputs obtained after N low-resolution INPUT image patches pass through the discriminator network.

The first item attempts to maximize an output of the discriminator network D ( ), or equivalently attempts to make the output image that has been lifted by the generator network look like the original high-resolution color image for the discriminator network. If only the first item is used, the generator network will find the simplest, realistic images that are unrelated to the input image, they are those unchanged low-resolution images. Therefore, it is desired that not only the first item will be considered to solve the cost function problem of the generator network. The second item emphasizes that a degraded image obtained after subjecting the output image of the generator network to the same degradation process as that of extracting the low-resolution color image from the high-resolution color image should match these low-resolution color images as much as possible, as such, it encourages the generator network to find meaningful solutions. The third term is configured to improve the results of the generator network by using a bias larger than the weight of the filter. In general, it is convenient for the convolutional neural network to have a large bias (B), because they separate features into classes that are processed independently, and values of these features depend on the weight (W) of the filter, so in the third term, it is desired to apply a bias larger than the weight.

While $\lambda_1$ and $\lambda_2$ are weighting coefficients.

The second item $\lambda_1^{DownReg(INPUT)}$ and the third item $\lambda_w^{WBratioReg(W_G, b_G)}$ will be introduced in detail below.

1) Reproduce Degradation Processing:

The low-resolution INPUT image patch mentioned above is extracted from the original high-resolution REFERENCE image patch by performing degradation on the original high-resolution REFERENCE image patch to reduce the resolution. In order to forcibly apply this property in the output of the discriminator network, it is added as a regularization item $\lambda_1^{DownReg(INPUT)}$ in an embodiment of the present disclosure.

DownReg(INPUT)=MSE(Downscale(Output(INPUT)), INPUT) or DownReg(INPUT)=1-SSIM(Downscale(Output (INPUT), INPUT)

Herein, Output(INPUT) represents, as mentioned previously, the output image generated after the input low-resolution mage patch INPUT passes through the generator network. Downscale(Output(INPUT)) represents a degraded image obtained after subjecting the output image Output (INPUT) of the generator network to the same degradation process as that of extracting the low-resolution color image (INPUT image patch) from the high-resolution color image (REFERENCE image patch). While MSE (Downscale(Output(INPUT)), INPUT) and SSIM(Downscale(Output(INPUT), INPUT) represent a degree of difference between the degraded image obtained above and the low-resolution color image (INPUT image patch). The functions of MSE ( ) and SSIM ( ) are the conventional Mean Square Error (MSE) and Structural Similarity (SSIM) techniques. The definitions of MSE ( ) and SSIM ( ) will be described in detail below:

Mean Square Error (MSE):

$$MSE = \frac{1}{HW} \sum_{ij}^{H,W} (Output_{ij}(INPUT) - REFERENCE_{ij})^2$$

Structural Similarity (SSIM):

$$SSIM = \frac{(2\mu_O\mu_R + C1)(2\sigma_{OR} + C2)}{(\mu_O^2 + \mu_R^2 + C1)(\sigma_O^2 + \sigma_R^2 + C2)}$$

where $$\mu_x = \frac{1}{HW} \sum_{i,j}^{H,W} X_{i,j}$$

(in the above formula, X=O (representing Output(INPUT)) or X=R (representing REFERENCE)).

$\sigma_X^2 = \mu_{X^2} - \mu_X^2$ $\sigma_{XY} = \mu_{XY} - \mu_X\mu_Y$

Herein, C1 and C2 are coefficients, for example, C1=$(0.01)^2$ and C2=$(0.03)^2$.

Herein, $\mu_O$ and $\mu_R$ are an average of Output(INPUT) and an average of REFERENCE, respectively. $\sigma_O$ and $\sigma_R$ are a variance of Output(INPUT) and REFERENCE. And $\sigma_{OR}$ is a covariance of Output(INPUT) and REFERENCE. Herein, H and W represents that the resolute of the image is H (height) *W(width).

2) The L1 norm of the weight bias ratio:

Herein, the L1 or L1 norm mathematically refers to the average absolute value. In general, it is convenient for the convolutional neural networks to have a large bias parameter (B), because they separate features into classes that are processed independently of each other. The values of these features depend on the weight (W) of the filter of the convolutional layer. Therefore, it is desirable to apply a bias (B) larger than the weight (W) by using a regularization term:

$$WBratioReg(W, B) = \frac{L1(W)}{L1(B) + eps}$$

where $$L1(W) = \frac{1}{LFNM} \sum_{l,f,i,j}^{L,F,N,M} |W_{i,j}^{f,l}|$$

($\sum_{l,f,i,j}^{L,F,N,M} |W_{i,j}^{f,l}|$ is obtaining a sum on all layers L, features F and filter elements N×M), and $$L1(B) = \frac{1}{LF} \sum_{l,f}^{LF} |B^{f,l}|$$

($\sum_{l,f}^{LF} |B^{f,l}|$ is obtaining a sum on all layers L and features F), eps is a fixed decimal to prevent infinity or infinitesimal situations in division, for example, eps=1e-6.

The specific formula examples of the generator cost function and the discriminator cost function are introduced in the above. However, this is not a limitation. The generator cost function and the discriminator cost function may take the form of other formulas, so that the generator cost function is based on parameters of the discriminator network (using the output of the discriminator network), and the discriminator cost function is based on the parameters of the generator network (using the output image of the generator network).

Since the generator cost function and the discriminator cost function are intended to be reduced continuously to the minimum, thereby obtaining the optimal parameter set of the generator network and the optimal parameter set of the discriminator network, therefore, finally, standard stochastic gradient descending (SGD) algorithm, momentum SGD, Adam, RMSProp, AdaDelta, Wasserstein Generative Adversarial Network (WGAN) and improved algorithm thereof can be adopted to obtain the optimal parameter sets. These algorithms are all existing algorithms, and the detailed principles are not described herein.

As such, according to the innovative cost functions, the generator network and the discriminator network that are "adversarial" to each other compete and continually improve in each iteration based on better and better results of the other network, being trained to obtain better and better parameters or even optimal parameters.

Video lifting and frame rate up-conversion

Various embodiments of the present disclosure may also be configured to lift the resolution of a video sequence. An easy way to do this is lifting the video frames one by one. For a large lift factor (a large resolution magnification), using this strategy can be problematic, because edges of an output frame and motion of an object may produce visible flicker.

In an embodiment, an average of several video frames may be used as an input:

$$INPUT_t = \sum_{k=A}^{B} c_k FRAME_{t+k}$$

Herein, $c_k$ is a fixed weight assigned to each frame, A, B are an integer (positive or negative). According to the research, a linear combination inputted to the generator network is more likely to produce a realistic artificial output, smooth operation, and consistency with the input image.

Figure 8:
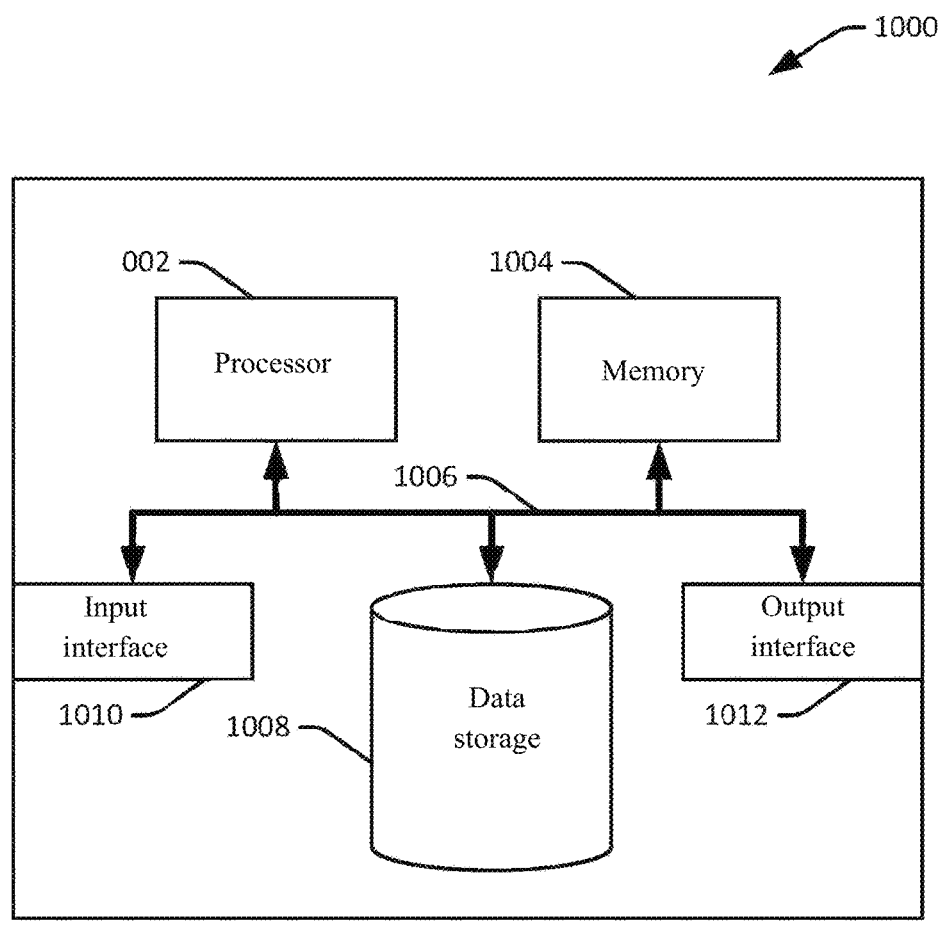
FIG. 8 shows an exemplary processing system that can be configured to implement the processing method of the present disclosure.

FIG. 8 shows an exemplary processing system that can be configured to implement the processing method of the present disclosure.

The processing system 1000 comprises at least one processor 1002 that executes instructions stored in a memory 1004. These instructions may be, for example, instructions for implementing the functions described as being performed by one or more of the modules described above, or instructions for implementing one or more steps in the methods described above. The processor 1002 may access the memory 1004 through a system bus 1006. In addition to storing executable instructions, the memory 1004 may also store training data and the like. The processor 1002 may be a variety of devices with computing capability such as Central Processing Unit (CPU) or Graphic Processing Unit GPU. The CPU may be an X86 or an ARM processor; the GPU may be integrated directly on the motherboard separately, or it may be built into the motherboard's North Bridge chip, or it may be built on the Central Processing Unit (CPU).

The processing system 1000 further comprises a data storage 1008 that is accessible by the processor 1002 via the system bus 1006. The data storage 1008 may include executable instructions, multi-image training data, and the like. The processing system 1000 further comprises an input interface 1010 that allows external devices to communicate with the processing system 1000. For example, the input interface 1010 may be configured to receive instructions from an external computer device, from a user, or the like. The processing system 1000 may also comprise an output interface 1012 that interfaces the processing system 1000 with one or more external devices. For example, the processing system 1000 may display an image or the like through the output interface 1012. It is contemplated that an external device that communicates with the processing system 1000 through the input interface 1010 and the output interface 1012 may be included in an environment that provides virtually a user interface with which any type of users can interact. Examples of user interface include graphic user interfaces, natural user interfaces, and the like. For example, the graphic user interface may accept an input from a user using an input device such as a keyboard, a mouse, a remote controller, etc., and provide an output on an output device such as a display. In addition, the natural language interface may enable the user to interact with the processing system 1000 without being constrained by an input device such as a keyboard, a mouse, a remote controller, etc. In contrast, the natural user interface may rely on speech recognition, touch and stylus recognition, gesture recognition on and near the screen, aerial gesture, head and eye tracking, voice and speech, vision, touch, gesture, and machine intelligence, etc.

In addition, although the processing system 1000 is shown as a single system in the drawings, it can be understood that the processing system 1000 may also be a distributed system and may also be arranged as a cloud facility (including public cloud or private cloud). Thus, for example, several devices may communicate over a network connection and may perform tasks described as being performed by the processing system 1000 collectively.

The various functions described herein (including but not limited to convolutional neural network modules, selection modules, etc.) may be implemented in hardware, software, firmware, or any combination thereof. If implemented in software, the functions may be stored on a computer-readable medium as one or more instructions or codes or transmitted thereby. The computer-readable medium includes a computer-readable storage medium. The computer-readable storage medium may be any available storage medium that can be accessed by a computer. By way of example, rather than restrictive, such computer-readable medium may include RAM, ROM, EEPROM, CD-ROM, or other optical disk storage, magnetic disk storage or other magnetic storage devices, or any other medium that may be configured to carry or store instructions or desired program codes in data structure forms and can be accessed by a computer. In addition, a propagated signal is not included in the scope of computer-readable storage medium. The computer-readable medium also includes communication medium, including any medium that facilitates transfer of a computer program from one place to another. The connection may be, for example, a communication medium. For example, if the software is transmitted from a web site, a server, or other remote source by using coaxial cable, fiber optic cable, twisted pair, digital subscriber line (DSL), or wireless technology such as infrared, radio, and microwave, said coaxial cable, fiber optic cable, twisted pair, DSL, or wireless technology such as infrared, radio, and microwave are included in the definition of communication medium. Combinations of the above should also be included within the scope of computer-readable medium. Alternatively or additionally, the functions described herein may be performed at least in part by one or more hardware logic components. For example, illustrative types of hardware logic components that may be used include field programmable gate arrays (FPGA), program-specific integrated circuits (ASIC), program-specific standard products (ASSP), system-on-chip (SOC), and complex programmable logic devices (CPLD), etc.

The above description is merely exemplary embodiments of the present disclosure, not intended to limit the protection scope of the present disclosure. The protection scope of the present disclosure is defined by the appended claims.

What is claimed is:

1. A processing method for a convolutional neural network, comprising training a generator and training a discriminator, wherein training a generator comprises:

extracting a low-resolution color image from a high-resolution color image;

training parameters of a generator network, by using the low-resolution color image and a noise image as an input image, based on parameters of a discriminator network, and reducing a generator cost function, wherein, the generator network includes a lifting layer for lifting resolutions of a luminance component and a chrominance component of the input image; the generator cost function represents a degree of difference between an output image of the generator network and the high-resolution color image;

training a discriminator comprises:

inputting the output image of the trained generator network and the high-resolution color image to the discriminator network, respectively;

training parameters of the discriminator network by reducing a discriminator cost function, wherein, the discriminator network includes a pooling layer for reducing resolution; the discriminator cost function represents a degree in which the output image of the generator network corresponds to the high-resolution color image.

2. The processing method according to claim 1, further comprising alternately performing the steps of training the generator network and training the discriminator network.

3. The processing method according to claim 1, wherein the generator cost function is composed of a first item, a second item, and a third item which is optional, the first item is based on an output obtained after the output image of the generator network passes through the discriminator network;

the second item is based on a difference between the low-resolution color image, and a degraded image obtained after subjecting the output image of the generator network to a same degradation process as that from the high-resolution color image to the low-resolution color image;

the third item is based on a ratio of a magnitude of a weight of a filter in a convolutional layer to a magnitude of a bias of an activation layer as included in parameters of the generator network.

4. The processing method according to claim 1, wherein the discriminator cost function is composed of a first item, a second item, and a third item which is optional, the first item is based on an output obtained after the output image of the generator network passes through the discriminator network;

the second item is based on an output obtained after the high-resolution color image passes through the discriminator network;

the third item is based on an output obtained after a combination of the output image of the generator network and the high-resolution color image passes through the discriminator network.

5. The processing method according to claim 1, wherein a degree of resolution lifting of the luminance component is the same as a degree of resolution lifting of the chrominance component, wherein the generator network includes any one of the following:

a first generator network having a same number of first lifting layers for both the luminance component and the chrominance component;

a second generator network having a certain number of first lifting layers for the luminance component, and having first lifting layers for the chrominance component that are fewer than the first lifting layers for the luminance component, and second lifting layers different from the first lifting layers for the chrominance component;

a third generator network having a certain number of first lifting layers for the luminance component, and having second lifting layers different from the first lifting layers for the chrominance component.

6. The processing method according to claim 1, wherein the lifting layer is interposed between a convolutional layer and an activation layer of the generator network, and a degradation layer is interposed between a convolutional layer and an activation layer of the discriminator network;

parameters of the generator network include a weight of a filter of the convolutional layer, a bias of the activation layer, and a lifting parameter of the lifting layer in the generator network;

parameters of the discriminator network include a bias of the activation layer, a weight of a filter of the convolutional layer, and a degrading parameter of the degrading layer in the discriminator network;

at initialization, parameters of the generator network and parameters of the discriminator network are predetermined or random.

7. The processing method according to claim 5, wherein the activation layer is a switching unit which is turned on when an activation condition is satisfied.

8. The processing method according to claim 1, wherein the discriminator network further includes an averager configured to average all pixels of an image whose resolution is reduced by the pooling layer, so as to obtain an index indicating whether an input to the discriminator network is the output image of the trained generator network or the high-resolution color image.

9. The processing method according to claim 1, wherein extracting the low-resolution color image comprises:

segmenting from a series of high-resolution color sample images, to obtain a plurality of high-resolution color images having a size smaller than that of the high-resolution color sample image;

performing a degradation process on the plurality of high-resolution color images, to obtain a plurality of low-resolution color images with a reduced resolution.

10. The processing method according to claim 1, wherein the noise image is a white noise image.

11. The processing method according to claim 1, wherein the lifting layer copies pixels inputted to the lifting layer to a plurality of different locations of an output of the lifting layer which has a resolution higher than the resolution of the input pixels.

12. The processing method according to claim 1, wherein the pooling layer includes at least one of a degradation layer corresponding to the lifting layer, a Max-pooling layer, and an Average-pooling layer.

13. The processing method according to claim 1, wherein a resolution of the output image of the generator network is the same as a resolution of the high-resolution color image.

14. The processing method according to claim 1, wherein the low-resolution color image is an average of a plurality of consecutive video frames.

15. A processing system for a convolutional neural network, comprising:

one or more processors;

one or more memories in which computer-readable codes are stored, when the computer-readable codes are executed by the one or more processors, the processing method according to claim 1 is carried out.

16. A non-transitory computer storage medium, in which computer-readable codes are stored, when the computer-readable codes are executed by the one or more processors, the processing method according to claim 1 is carried out.

17. The processing method according to claim 2, wherein the generator cost function is composed of a first item, a second item, and a third item which is optional, the first item is based on an output obtained after the output image of the generator network passes through the discriminator network;

the second item is based on a difference between the low-resolution color image, and a degraded image obtained after subjecting the output image of the generator network to a same degradation process as that from the high-resolution color image to the low-resolution color image;

the third item is based on a ratio of a magnitude of a weight of a filter in a convolutional layer to a magnitude of a bias of an activation layer as included in parameters of the generator network.

18. The processing method according to claim 2, wherein the discriminator cost function is composed of a first item, a second item, and a third item which is optional, the first item is based on an output obtained after the output image of the generator network passes through the discriminator network;

the second item is based on an output obtained after the high-resolution color image passes through the discriminator network;

the third item is based on an output obtained after a combination of the output image of the generator network and the high-resolution color image passes through the discriminator network.

19. The processing method according to claim 3, wherein the discriminator cost function is composed of a first item, a second item, and a third item which is optional, the first item is based on an output obtained after the output image of the generator network passes through the discriminator network;

the second item is based on an output obtained after the high-resolution color image passes through the discriminator network;

the third item is based on an output obtained after a combination of the output image of the generator network and the high-resolution color image passes through the discriminator network.

20. The processing method according to claim 2, wherein a degree of resolution lifting of the luminance component is the same as a degree of resolution lifting of the chrominance component, wherein the generator network includes any one of the following:

a first generator network having a same number of first lifting layers for both the luminance component and the chrominance component;

a second generator network having a certain number of first lifting layers for the luminance component, and having first lifting layers for the chrominance component that are fewer than the first lifting layers for the luminance component, and second lifting layers different from the first lifting layers for the chrominance component;

a third generator network having a certain number of first lifting layers for the luminance component, and having second lifting layers different from the first lifting layers for the chrominance component.

* * * * *